so that linear motion of the motor coil is converted to rotative motion of the transducer whereby the transducer and the ultrasonic beam it emits is caused to sweep through a selected angular sector. A position sensor formed of a supplemental stationary magnetic material and a position coil mounted for movement with the motor coil is utilized for detecting the linear position of the coil and, correspondingly, the angular orientation or position of the transducer element.

United States Patent [19]

Angelsen

[11] Patent Number: 4,757,818
[45] Date of Patent: Jul. 19, 1988

[54] ULTRASONIC TRANSDUCER PROBE WITH LINEAR MOTION DRIVE MECHANISM

[76] Inventor: Bjorn A. J. Angelsen, Anders Tvereggens veg 34, 7000 Trondheim, Norway

[21] Appl. No.: 835,607

[22] Filed: Mar. 3, 1986

[51] Int. Cl.⁴ .............................................. A61B 10/00
[52] U.S. Cl. ...................................... 128/660; 73/633
[58] Field of Search ...................... 464/55, 56; 73/620, 73/633, 641; 128/660, 663, 661

[56] References Cited

U.S. PATENT DOCUMENTS

| 4,385,521 | 5/1983 | Hagen et al. | 73/633 X |
| 4,421,118 | 12/1983 | Dow et al. | 73/620 X |
| 4,567,895 | 2/1986 | Putzke | 128/660 |
| 4,649,925 | 3/1987 | Dow et al. | 128/660 |

Primary Examiner—Francis J. Jaworski
Attorney, Agent, or Firm—Cohen, Pontani & Lieberman

[57] ABSTRACT

An ultrasonic transducer probe having a mechanically steerable acoustic element includes a linear motor having a stationary magnet assembly and a coil bidirectionally linearly movable with respect to the magnet assembly. A mechanical arrangement formed of a pair of spaced apart, rotatably mounted pulleys and a flexible belt connecting the pulleys couples the coil and an ultrasonic transducer or acoustic element. The transducer element is mounted for rotation with at least one of the pulleys so that linear motion of the motor coil is converted to rotative motion of the transducer whereby the transducer and the ultrasonic beam it emits is caused to sweep through a selected angular sector. A position sensor formed of a supplemental stationary magnetic material and a position coil mounted for movement with the motor coil is utilized for detecting the linear position of the coil and, correspondingly, the angular orientation or position of the transducer element.

7 Claims, 3 Drawing Sheets

ULTRASONIC TRANSDUCER PROBE WITH LINEAR MOTION DRIVE MECHANISM

BACKGROUND OF THE INVENTION

This invention relates to an ultrasonic transducer probe having a mechanically steered acoustic element so that the ultrasonic beam can be steered within a sector of a plane. The probe is primarily intended to be used for ultrasonic imaging of biological tissue structures together with blood velocity measurements and imaging of blood flow.

There exist in the market several similar devices for similar applications. The problem with present devices is that it is difficult to do simultaneous imaging and Doppler measurements. Using the Missing Signal Estimator method, as described in U.S. patent application Ser. No. 440,255 filed Nov. 9, 1982, it is possible to obtain for practical purposes simultaneous 2-Dimensional (2D) amplitude imaging and Doppler blood velocity measurements along a defined beam direction, if the transducer can be stopped very quickly from its sweeping motion during imaging to do the Doppler measurement along the defined beam direction, and then be rapidly accelerated after the measurement to perform a new imaging sweep. The present invention provides a design for achieving rapid acceleration of beam direction movement so that for practical purposes simultaneous imaging and Doppler measurement can be attained. The rapid acceleration achieved is also useful for combined 2D tissue imaging and 2D flow measurements, as described in U.S. patent application Ser. No. 603,511 filed April 24, 1984.

At this point reference is made to U.S. Pat. No. 4,421,118 (Dow) in which an ultrasonic transducer is disclosed. The Dow transducer comprises a transducer head assembly containing a movable holder having a transducer element coupled to a stationary base by a mechanical linkage. A motor adapted to provide linear reciprocating motion is coupled to the mechanical linkage for causing the element holder and element, when driven by the motor, to undergo reciprocating swinging motion for transmitting ultrasonic energy to and receiving echo signals from an object in front of the transducer in a sector scanning manner. The mechanical linkage in this known arrangement, however, has serious drawbacks which are particularly related to the problem of obtaining a rapid acceleration of the angular sweep.

Thus the novelty of the present invention lies in the mechanical design by which rapid acceleration of the beam direction can be achieved so that complex sweep sequences can be obtained as, for example, that illustrated in FIG. 1 and further described hereinafter.

A Missing Signal Estimator, in accordance with U.S. patent application Ser. No. 440,255 of Nov. 9, 1982, is used to generate a Doppler substitute signal based on Doppler measurements in the intervals when the transducer stands still. This Doppler substitute signal is utilized in the periods during which 2D tissue or flow imaging is performed, so that an apparently simultaneous imaging and Doppler measurement is obtained.

The purpose of the present invention of an ultrasonic probe design is accordingly to obtain a rapid acceleration of the transducer so that the periods of switching the beam direction can be kept sufficiently small as to be practically negligible, with tolerable vibration of and power consumption by the transducer. It is also important, especially for flow imaging, that the beam motion be smooth in the sweep intervals so as to avoid high Doppler shifts from tissue.

According to the present invention the foregoing are attained in an ultrasonic transducer probe having a mechanically steerable acoustic element which includes a linear motor having a stationary magnet assembly and a coil bidirectionally linearly movable with respect to the magnet assembly. A mechanical arrangement formed of a pair of spaced apart, rotatably mounted pulleys and a flexible belt connecting the pulleys couples the coil and an ultrasonic transducer or acoustic element. The transducer element is mounted for rotation with at least one of the pulleys so that linear motion of the motor coil is converted to rotative motion of the transducer whereby the transducer and the ultrasonic beam it emits is caused to sweep through a selected angular sector. A position sensor formed of a supplemental stationary magnetic material and a position coil mounted for movement with the motor coil is utilized for detecting the linear position of the coil and, correspondingly, the angular orientation or position of the transducer element.

Further objects, features and advantages of the present invention will be more fully appreciated by reference to the following detailed description of a presently preferred, but nonetheless illustrative, embodiment in accordance with the present invention when taken in conjunction with the accompanying drawing.

BRIEF DESCRIPTION OF THE DRAWINGS

In the drawings, wherein similar reference characters denote similar elements throughout the several views.

DETAILED DESCRIPTION OF THE EMBODIMENT

Figure 1A:
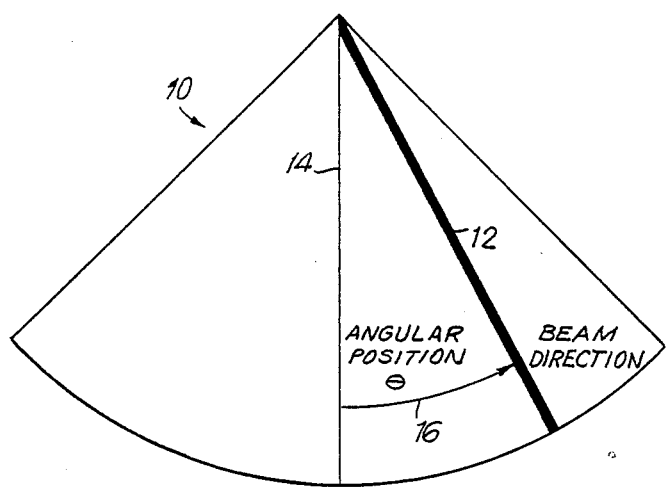
FIGS. 1a and 1b diagrammatically and graphically illustrate by way of example a composite angular sweep of an ultrasonic transducer with rapid jumps in beam direction for combined tissue imaging, flow imaging and blood velocity measurements.
Figure 1B:
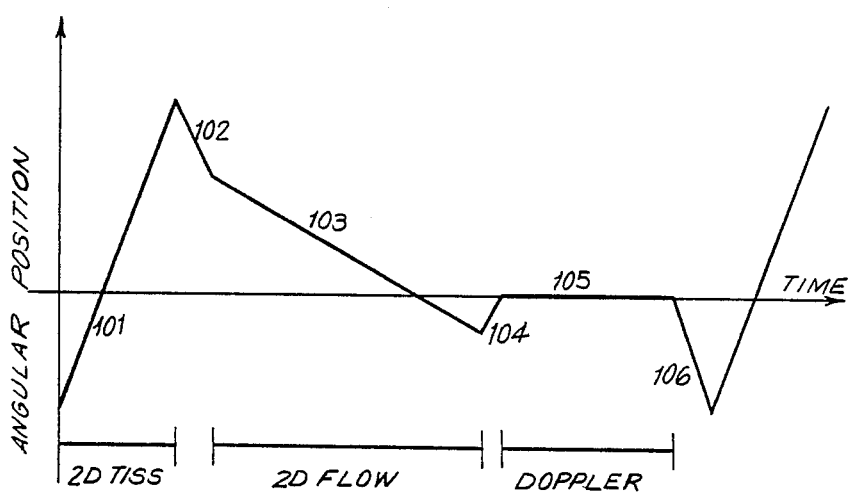

FIG. 1a illustrates a sector 10 of a plane within which an ultrasonic transducer beam is sweeping. A heavy black line 12 indicates the then current beam direction; the angular position of the beam is measured from the sector center line 14 to the beam direction 12, as indicated by arrow 16. FIG. 1b charts, by way of typical example, the changing angular position of the sweeping ultrasonic beam over a time interval. Thus, FIG. 1b illustrates the following discernable beam sweep segments:

1. a first sector sweep 101 of the beam for performing pulse echo amplitude imaging of biological tissue (~20 msec);

2. a rapid change 102 of beam direction (~5 msec or less) preparatory to a second sector sweep 103 beginning at a decreased angular position for performing pulse echo Doppler flow imaging (~40 msec);

3. another rapid change 104 of beam direction (~5 msec or less) to a stationary beam angular position 105 for performing either pulsed or continuous wave Doppler blood velocity measurements; and 4. yet another rapid change 106 of beam direction to a predetermined angular position for initiating a new sequence of beam sweeps 101 to 105.

It is intended that the ultrasonic transducer probe of the present invention meet two design criteria deemed important to its contemplated utility. The first criteria is that the probe provide for rapid acceleration of the beam direction so as to minimize switching time between its anticipated modes of operation—i.e. 2-dimensional structure imaging, 2-dimensional flow imaging and Doppler blood velocity measurements. Second, it is desired to provide for constant sweep velocity of the ultrasonic beam (i.e. no high frequency vibrations) to thereby avoid high Doppler shifts in the signals from tissue and thus artifacts in the flow image.

In attaining performance meeting this second criteria, it is important to avoid the use of gear transmission arrangements—such for example as those incorporating bevel gears, or rack and pinion mechanisms—as such arrangements can cause or introduce vibrations unless carefully fabricated and assembled, thereby increasing the cost of the probe. It is therefore preferred to employ either a drive motor, where the acoustic transducer is directly mounted to the moving element of the motor (as either an integral part of the moving element or connected for example through a rod), or a pulley system or belt type transmission arrangement between the motor and the acoustic element.

Figure 2:
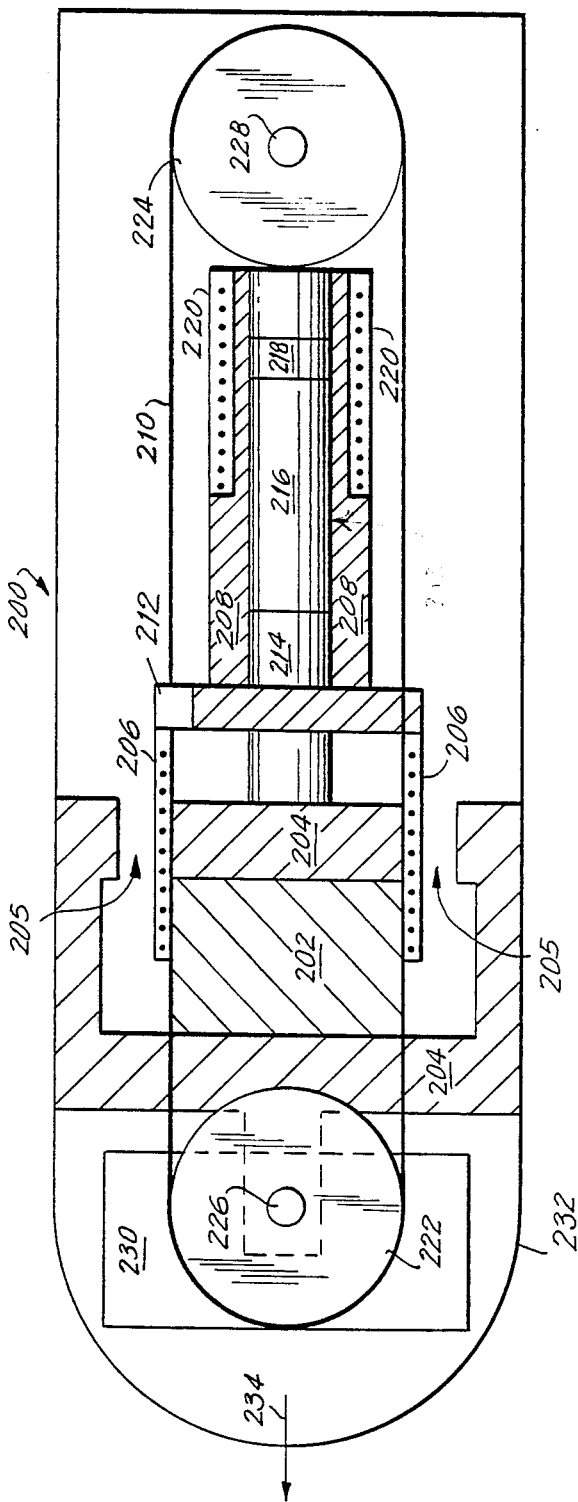
FIG. 2 is a simplified longitudinal cross section of a preferred embodiment of an ultrasonic transducer probe having a mechanically steerable ultrasonic beam constructed in accordance with the present invention.

For the rapid beam accelerations intended it is important to utilize an efficient electric motor providing a large force with minimum electric losses. Toward this end, the magnetic field should be concentrated in a narrow air gap. In a particularly advantageous arrangement the motor is separate from the acoustic transducer so that the motor and transducer can be individually configured and shaped for optimum performance. It is equally important to keep the mass of moving parts small, which is readily achievable by employing a motor design having a moving coil and a fixed permanent magnet with a narrow airgap for generating a strong stationary magnetic field. Such an arrangement employing a moving coil can be attained with either a linear or a rotary motor design. To maintain a cylindrical transducer shape of relatively small diameter that fits conveniently into the user's hand, like a pen or pencil, and also utilizes a pulley or belt-type transmission arrangement, a linear motor with a pulley transmission is preferred as depicted in FIG. 2.

For rapid acceleration, the disclosed pulley system of the invention provides substantial advantages over the mechanical linkage used to transfer linear to rotary motion in the arrangement of U.S. Pat. No. 4,421,118 (Dow). The range or extension of linear motion, and thus the mass of moving parts employed, can be further reduced by utilizing a pulley wheel having an angle dependent—as opposed to a constant—radius as hereinafter discussed.

The currently preferred embodiment of the transducer probe 200 of the invention shall now be described with reference to FIG. 2. As there shown, a cylindrical magnet 202 with a magnetic field iron circuit 204 generates a strong magnetic field across an annular airgap 205. A cylindrical electric (motor) coil 206, through which an electric current is passed for generating an electromagnetic force along its cylindrical axis, is disposed for axial bidirectional movement through airgap 205. Motor coil 206 is mounted to a coil assembly 208, and assembly 208 is in turn connected to a flexible pulling element 210 at attachment portion 212 of assembly 208. Motor coil 206, together with its integrally secured assembly 208, is accordingly linearly movable axially through the airgap 205, its movement being guided by a shaft assembly 213 at its end closest to iron circuit 204 and extending axially rearwardly from magnetic field iron circuit 204 through an opening (not shown) defined in the forward portion of assembly 208, and formed of portions or sections 214, 216 and 218. Portions 214 and 218 of this shaft assembly 213 may be constructed of a noncritical material, which is preferably nonmagnetic and nonconducting, while portion 216 comprises a magnetic material, preferably nonconducting, such as a ferrite.

Mounted on coil assembly 208, and carried through bidirectional linear movement therewith, is a second coil 220 the lead connections to the transducer 230 and to the coils 206, 220 may be by any conventional means—. Thus, as coil assembly 208 moves, so too moves coil 220 peripherally along and over the magnetic portion 216 of shaft assembly 213. The inductance of second coil 220 will accordingly depend on its position relative to magnetic shaft portion 216, and thus on the position of coil assembly 208; coil 220 can therefore be readily employed as a simple position sensor. By feeding an AC current through the second or position coil 220 with a predetermined frequency and amplitude, the voltage over the coil will be proportional to the coil inductance and, therefore, dependent on the position of the coil assembly. In order to avoid eddy currents induced by the current in position coil 220, the materials of shaft assembly 213 should be nonconducting. The constructional material of shaft portion 214 should also be nonmagnetic so as to avoid magnetic interference between the motor coil 206 and the position coil 220.

The pulling element 210 extends between and partially about each of spaced apart pulley wheels 222 and 224 which rotate about respective rotatable shafts 226 and 228. By this arrangement the linear motion of the coil assembly 208 is transformed into a rotary motion of the pulley wheels 222, 224. An acoustic transducer 230 is mounted or connected to one of the wheel shafts, as for example shaft or axle 226 as indicated in the figure, for rotation with the respective pulley wheel 222. The entire assemblage is then disposed within a cover 232 filled with a liquid which transmits the ultrasound beam 234 generated by angularly steerable transducer 230 through the front material of the probe 200.

As herein described, the moment or lever arm in the transfer from linear to rotary motion is constant with the pulley system disclosed, independent of the angular position of the beam. The linear stroke of the motor coil is accordingly shorter or smaller for a given beginning angle of the sector scan, as compared to systems employing a mechanical linkage rod or arrangement. Moreover, since the lever arm is constant, there is a linear relationship between the linear position of the coil and the angular orientation or position of the beam. It is as a consequence far simpler to employ a position sensor for detecting linear motion of the coil rather than angular motion of the transducer. Of course, the pulling element must be sufficiently inelastic that the resonance frequency of transmission is well above the required bandwidth. A notably simple position sensor can thus be employed as, for example, illustrated in the FIG. 2 embodiment; other methods of position sensing, such as bicoil induction, can alternatively be used.

Figure 3:
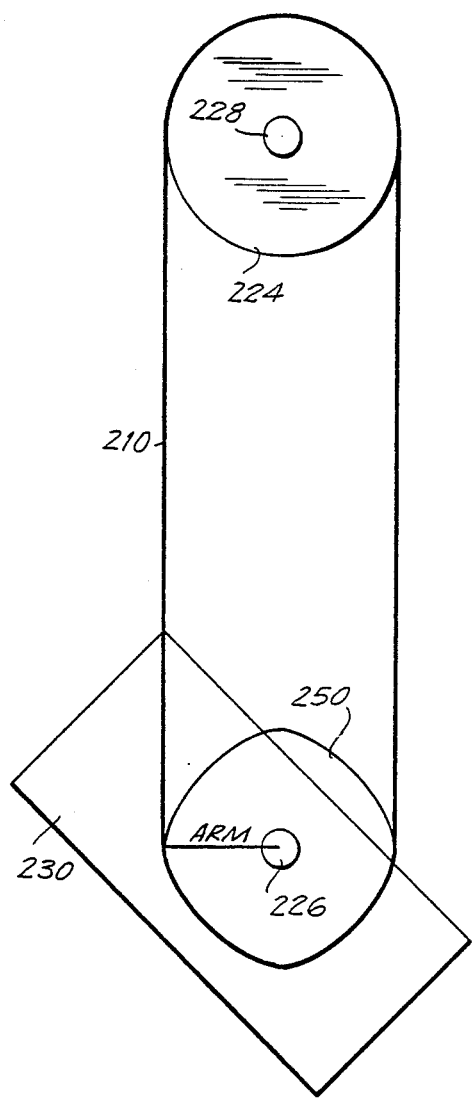
FIG. 3 diagrammatically illustrates an alternate embodiment of a transducer steering arrangement in accordance with the invention and incorporating a pulley wheel having an angle dependent radius.

To maintain the pulley wheel lever arm when the beam direction is at the outer extensions of the sweep sector, while reducing the linear stroke of the motor coil, a noncircular pulley wheel 250, such as that illustrated in FIG. 3, can be employed in lieu of a constant radius pulley wheel 222 or 224. In such a noncircular wheel 250 the radius varies in angular dependence upon the wheel position providing, by way of example, a larger lever arm at the outer sweep extensions of the beam, where a large momentum is required, and a smaller lever arm at more central beam directions within the sector requiring less linear motion of the motor coil. By this modification a shorter coil can be employed and the mass of moving parts reduced.

While there have been shown and described and pointed out fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. An ultrasonic probe having a mechanically steerable ultrasonic beam for use in combined and time-shared modes of ultrasonic imaging of biological tissue structures together with blood velocity measurements and imaging of blood flow based on the Doppler principle, in which rapid changes of sweep movements of the prove between the respective imaging and measurement modes of operation are performed, said probe comprising:
   a linear motion electric drive motor having stationary magnet means and coil means selectively linearly movable with respect to said magnet means by the application of an electric current to said coil means;
   an ultrasonic transducer means for emitting an ultrasonic beam and disposed for pivotal movement within an angular sector for sweeping the ultrasonic beam across at least a portion of said angular sector; and
   mechanical coupling means for connecting said linear drive motor to the pivotally mounted transducer means and converting said linear motion of the coil means into a limited rotary motion of said transducer means within the angular sector, said coupling means comprising at least two rotatable pulleys mounted in a relatively spaced apart relation and a flexible pulling element trained about and between said spaced apart pulleys;
   said ultrasonic transducer means being connected to at least one of said pulleys for rotation therewith; and
   said motor coil means being mechanically connected to said pulling element at a portion thereof lying between said spaced apart pulleys for movement of said coil means with said pulling element so that selected linear movement of said coil means relative to said stationary magnet means by the application of an electric current to said coil means effects steered sweeping of said ultrasonic beam across at least a portion of the angular sector.

2. An ultrasonic probe in accordance with claim 1, further comprising a position sensing means for detecting the angular position of the beam in said angular sector, said position sensing means including a sensor element connected to and adapted for movement with said motor coil means.

3. An ultrasonic probe in accordance with claim 2, said at least one of said spaced apart pulleys to which said transducer means is connected having a non-circular circumference with an angle dependent radius, and said flexible pulling element being trained about said non-circular circumference of said at least one pulley.

4. An ultrasonic probe in accordance with claim 2, said position sensing means further comprising a stationary magnetic means, and said sensor element comprising position coil means movable with said motor coil means along and relative to said stationary magnetic means to thereby vary the inductance of said position coil means in dependence upon the relative positions of said stationary magnetic means and said position coil means.

5. An ultrasonic probe in accordance with claim 1, said at least one of said spaced apart pulleys to which said transducer means is connected having a non-circular circumference with an angle dependent radius, and said flexible pulling element being trained about said non-circular circumference of said at least one pulley.

6. An ultrasonic probe in accordance with claim 3, further comprising an axle rotatably supporting each said spaced apart pulley, and said transducer means being mounted on said axle of said at least one of said pulleys.

7. An ultrasonic probe in accordance with claim 1, further comprising an axle rotatably supporting each said spaced apart pulley, and said transducer means being mounted on said axle of said at least one of said pulleys.

* * * * *